Patented Nov. 29, 1949

2,489,320

UNITED STATES PATENT OFFICE 2,489,320

NITRATION OF PARAFFINS

Edwin M. Nygaard and William I. Denton, Woodbury, and Richard B. Bishop, Haddonfield, N. J., assignors to Socony-Vacuum Oil Company, Incorporated, a corporation of New York No Drawing. Application November 15, 1945, Serial No. 629,001

12 Claims. (Cl. 260—644)

1

This application has to do with a novel process for the preparation of nitroparaffins from paraffins and, more specifically, has to do with a process for preparing 2-nitropropane and 2,2-dinitropropane from propane at elevated temperatures and pressures.

During the past decade considerable progress has been made in the synthesis of nitroparaffins. In the main this progress has primarily been made in the production of mononitroparaffins by vapor phase reaction of various alkanes with nitrating agents. Under such conditions, mixtures of mononitroparaffins are obtained from a paraffin; for example, nitromethane, nitroethane and nitropropanes are obtained from propane and suitable nitrating agents. In addition, partial oxidation products such as aldehydes, ketones and acids are obtained under such conditions, thereby presenting a separation problem and sacrifice in ultimate yield of nitroparaffin. This work has been reported in the literature in the several publications of H. B. Hass and his associates at Purdue University and Commercial Solvents Corporation. No progress, however, has been reported on the selective preparation of 2-nitropropane and 2,2-dinitropropane from propane. The present application is directed to a solution of this problem.

The present process involves reaction of propane and a nitrating agent at a temperature from about 150° C. to about 250° C. and at an elevated pressure, whereby 2-nitropropane and 2,2-dinitropropane are formed. Under the reaction conditions which characterize the present process, no appreciable reaction occurs between the nitrating agent and primary hydrogen atoms of propane; accordingly, no appreciable amount of 1-nitropropane or dinitropropane having a nitro group attached to a primary carbon atom is formed.

The nitrating agents used in the present process include nitric acids, particularly 40 to 70 per cent nitric acids; anhydrous nitric acid; oxides of nitrogen higher than NO, such as $NO_2$, $N_2O_3$, $N_2O_4$ and $N_2O_5$. Mixed acids such as nitric acid and sulfuric acid mixtures, which apparently contain nitrosulfuric acid, may also be used; however, such acids are limited to those in which the sulfuric acid is present in minor proportions. Of the foregoing nitrating agents, it is preferred that $NO_2$, $N_2O_4$ or nitric acids be used, and of such acids 40 to 70 per cent nitric acids (specific gravity, 1.25 to 1.42) are particularly preferred.

In carrying out the present process it has been found desirable, although not essential, to use a

2 diluent such as water, nitrogen, $CO_2$, etc. Particularly desirable is water in the proportions of from about 10 to about 80 mol per cent, based upon the sum of the molar quantities of propane, nitrating agent and water. Water is a product of the reaction and, therefore, dilution of the nitric acid used is not detrimental in a recycle or continuous process. In this connection, when 100 per cent nitric acid is used, the conversions of propane to 2-nitropropane and 2,2-dinitropropane, and the yields of the said products, are generally lower than when a more dilute nitric acid is used. The molar proportions of propane and of the nitrating agent used may be varied considerably, although it is preferred that an excess of propane be used.

One of the most critical factors in the present process is reaction temperature. Reaction between propane and the nitrating agent, such as nitric acid, occurs at about 150° C. and increasing amounts of 2-nitropropane and 2,2-dinitropropane are obtained with increase of temperature until a maximum is reached in the neighborhood of about 170° C. to about 230° C. As reaction temperatures of 250° C. are approached and exceeded the reaction becomes explosive in nature and, therefore, 250° C. represents about the maximum practical operating temperature. The effective temperature range, therefore, is from about 150° C. to about 250° C., with the preferred or optimum range from about 170° C. to about 230° C.

Pressure is another essential consideration in the present process. At atmospheric pressure, and the aforesaid temperatures, propane is not converted to 2-nitropropane and 2,2-dinitropropane. When pressures in excess of 150 pounds per square inch, or in excess of about 10 atmospheres, are used substantial conversions occur, with increasing conversions being obtained with increasing pressures. It has been found that pressures in excess of about 300 pounds per square inch are particularly desirable, with optimum pressures in the range of about 900 to about 1,200 pounds per square inch. Generally, the rate of increase of conversion decreases when pressures above about 1,200 per square inch are used.

Space velocity is another factor to be given consideration in this process and is defined herein as the volume of liquid reactants charged per hour per volume of reaction zone. At relatively low pressures, as of the order of 150 to 600 pounds per square inch, a space velocity of about 1 is optimum and small changes in space velocity have a relatively large effect on the conversion. Above 600 pounds per square inch the space velocity may be increased without substantially decreasing the conversion of propane to 2-nitropropane and 2,2-dinitropropane. In general, however, space velocities in excess of about 0.1 are used, but preference is given to those from about 0.5 to about 2.5.

In carrying out this process, it is preferred that the reaction zone used be comprised of or have an inert internal surface. For example, it has been found that an iron reactor promotes, to some extent, the decomposition of the charge materials, thereby decreasing the production of the desired 2-nitropropane and 2,2-dinitropropane. Stainless steel or high nickel steels have been found to be much more desirable especially from the viewpoint of corrosion resistance, although they exert a small promoting effect upon the decomposition of the charge materials. It has also been found that activated alumina, wood charcoal and various alumina-silica synthetic materials promote the decomposition of the charge materials. In view of this relationship, it is preferred to use reactors lined with inert material, or the aforesaid stainless steel or high nickel steels either empty or packed with inert surface materials such as glass beads, porcelain chips, and the like.

The following examples are provided hereinafter in order to further illustrate the present process. The reactor used consists of a ½ inch pipe-size, vertical stainless steel seamless tube 40 inches long, packed with 250 ccs. of glass beads which provide a large contact surface. The reactor tube is immersed in a bath of molten heat transfer salt ($KNO_3$-$NaNO_2$ mixture) for proper temperature control. The nitric acid is displaced by an inert liquid such as a light transformer oil from a stationary charge cylinder by means of a reciprocating pump while the propane is displaced by water in a similar manner. The nitric acid and propane are mixed and then conducted into a preheater of ¼ inch outside diameter stainless steel tubing. The aforesaid mixture is pumped through the said preheater into the top of the aforesaid reactor tube. The reaction mixture comes in contact with the inert glass beads under suitable reaction conditions and the reaction product obtained therefrom flows from the bottom of the reactor tube to a suitable condenser. Thereafter, it is drained from the high pressure system. The liquid and gaseous products obtained thereby are then separated; the 2-nitropropane and 2,2-dinitropropane may be separated from the liquid products by steam distillation, or by water washing and distilling the hydrocarbon layer obtained thereby. The 2-nitropropane and the remainder of the reaction mixture containing propane and nitrating agent may then be recycled, with or without fresh propane and-or nitrating agent through the reactor. The 2-nitropropane obtained in the reaction mixture, may also be recycled through a similar reactor with a nitrating agent to form 2,2-dinitropropane.

*Example I*

Propane (840 grams; 19.1 mols) and 70 per cent nitric acid (987 grams; equivalent to 10.8 mols of 100 per cent nitric acid) were charged to the system described above. The reaction conditions used were: temperature, 185° C.; pressure, 900 lbs. per square inch (gauge); space velocity, 2.0. Recovered from the reaction product were 128 grams of nitrated product. The latter product was distilled in a 50 plate column with a 20:1 reflux ratio and the following fractions were obtained:

(a) 107–117° C.: 4 grams, of which approximately 2.0 grams are $HNO_3$, 1.5 grams are 2-nitropropane and approximately 0.5 gram is nitroethane, as indicated by an infrared analysis.
(b) 117–126° C.: 91 grams of 2-nitropropane.
(c) 126–150° C.: 3.5 grams of which 1.7 grams are 2-nitropropane and 1.8 grams are 1-nitropropane.
(d) >150° C.: 18 grams of 2,2-dinitropropane.

This represents a conversion of 12.0 per cent of the nitric acid to 2-nitropropane and 2,2-dinitropropane, and only about 0.05 per cent to nitroethane and 0.17 per cent to 1-nitropropane. No nitromethane was found in the reaction product.

*Example II*

Propane (176 grams; 4 mols) and 70 per cent nitric acid (180 grams; equivalent to 2 mols of $HNO_3$) were charged to the system described above. The reaction conditions employed were: temperature, 190° C.; pressure, 900 pounds per square inch (gauge); space velocity, 2.0. Recovered from the reaction product were 16 grams of 2-nitropropane and 1.5 grams of 2,2-dinitropropane. The nitrated products represent a 10.1 per cent yield of theory per pass, based on the nitric acid charge; or a yield, by weight, of 14.5 per cent. Less than 0.20 per cent of 1-nitropropane or other nitro paraffins were formed from the charge materials, as indicated by infrared analysis of distillation fractions of the reaction product.

*Example III*

In this example, 510 grams of propane and 685 grams of 70 per cent nitric acid were charged to the previously described system, with the following reaction conditions being used: temperature, 205° C.; pressure, 900 pounds per square inch (gauge); space velocity, 2.0. The nitrated products obtained were 2-nitropropane, 38 grams, and 2,2-dinitropropane, 11.4 grams; equivalent to an 8.0 per cent conversion of nitric acid to nitrated products.

*Example IV*

Propane (234 grams; 5.3 mols) and 70 per cent nitric acid (280 grams; equivalent to 3.1 mols of 100 per cent nitric acid) were charged to the system previously described. The reaction conditions maintained were: temperature, 215° C.; pressure, 900 pounds per square inch (gauge); space velocity, 2.0. The reaction product was fractionated, whereupon 21 grams of 2-nitropropane and 3.0 grams of 2,2-dinitropropane were obtained. This represents a theoretical yield, per pass, of 9.2 per cent of nitrated products based on nitric acid charge.

The 2-nitropropane and 2,2-dinitropropane obtained in the present process are valuable chemical intermediates, and 2,2-dinitropropane is also a valuable ignition improving agent for Diesel fuels.

It is to be understood that this invention is not to be limited by the foregoing illustrative material, but is to be broadly construed in the light of the defining language of the appended claims.

This application is a continuation-in-part of our copending application Serial No. 613,712, filed on August 30, 1945, with Thomas T. Noland.

We claim:
1. The process for the selective conversion of propane to 2-nitropropane and 2,2-dinitropro- pane, which comprises: reacting propane with a nitrating agent at a temperature between about 150° C. and about 250° C. at an elevated pressure in excess of about 150 pounds per square inch and with a space velocity in excess of about 0.1.

2. The process for the selective conversion of propane to 2-nitropropane and 2,2-dinitropropane, which comprises: reacting propane with a nitrating agent at a temperature between about 170° C. and about 230° C. at an elevated pressure in excess of about 150 pounds per square inch and with a space velocity in excess of about 0.1.

3. The process for the selective conversion of propane to 2-nitropropane and 2,2-dinitropropane, which comprises: reacting propane with a nitrating agent at a temperature between about 150° C. and about 250° C. at an elevated pressure in excess of about 300 pounds per square inch and with a space velocity in excess of about 0.1.

4. The process for the selective conversion of propane to 2-nitropropane and 2,2-dinitropropane, which comprises: reacting propane with a nitrating agent at a temperature between about 150° C. and about 250° C. at an elevated pressure in excess of about 150 pounds per square inch and with a space velocity between about 0.5 and about 2.5.

5. The process for the selective conversion of propane to 2-nitropropane and 2,2-dinitropropane, which comprises: reacting propane with nitric acid at a temperature between about 150° C and about 250° C. at an elevated pressure in excess of about 150 pounds per square inch and with a space velocity in excess of about 0.1.

6. The process for the selective conversion of propane to 2-nitropropane and 2,2-dinitropropane, which comprises: reacting propane with 70 per cent nitric acid at a temerature between about 150° C. and about 250° C. at an elevated pressure in excess of about 150 pounds per square inch and with a space velocity in excess of about 0.1.

7. The process for the selective conversion of propane to 2-nitropropane and 2,2-dinitropropane, which comprises: reacting propane with a nitrating agent at a temperature between about 150° C. and about 250° C. at an elevated pressure in excess of about 150 pounds per square inch with a space velocity in excess of about 0.1, and in the presence of a diluent.

8. The process for the selective conversion of propane to 2-nitropropane and 2,2-dinitropropane, which comprises: reacting propane with a nitrating agent at a temperature between about 150° C. and about 250° C. at an elevated pressure in excess of about 150 pounds per square inch with a space velocity in excess of about 0.1, and in the presence of from about 10 to about 80 molar per cent of water, based upon the sum of the molar quantities of propane, nitrating agent and water.

9. The process for the selective conversion of propane to 2-nitropropane and 2,2-dinitropropane, which comprises: reacting more than one molar proportion of propane with one molar proportion of nitric acid at a temperature between about 150° C. and about 250° C. at an elevated pressure in excess of about 150 pounds per square inch and with a space velocity in excess of about 0.1.

10. The process for the preparation of 2-nitropropane and 2,2-dinitropropane, which comprises: reacting about two molar proportions of propane with a quantity of 70 per cent nitric acid containing about one molar proportion of nitric acid at about 190° C., a pressure of about 900 pounds per square inch and a space velocity of about 2.

11. The process for the preparation of 2-nitropropane and 2,2-dinitropropane, which comprises: reacting about two molar proportions of propane with a quantity of 70 per cent nitric acid containing about one molar proportion of nitric acid at about 215° C., a pressure of about 900 pounds per square inch and a space velocity of about 2.

12. The process for the selective conversion of propane to 2-nitropropane and 2,2-dinitropropane which comprises: reacting propane with an oxide of nitrogen higher than NO, at a temperature between about 150° C. and about 250° C. at an elevated pressure in excess of about 150 p. s. i. and with a space velocity in excess of about 0.1.

EDWIN M. NYGAARD.
WILLIAM I. DENTON.
RICHARD B. BISHOP.

REFERENCES CITED

The following references are of record in the file of this patent:

UNITED STATES PATENTS

| Number | Name | Date |
|---|---|---|
| 1,967,667 | Hass et al. | July 24, 1934 |
| 2,206,813 | Hass et al. | July 2, 1940 |
| 2,382,241 | Levy | Aug. 14, 1940 |
| 2,425,367 | Denton et al. | Aug. 12, 1947 |

OTHER REFERENCES

Hass et al., "Ind. & Eng. Chem.," March 1936, vol. 28, No. 3, pages 340 to 344.

Urbanski et al., "Chemical Abstracts," vol. 31 (1937), page 6190, abstract of "Rocziniki Chem.," vol. 17 (1937), pages 161–164.

Urbanski et al., "Chemical Abstracts," vol. 33 (1939), page 532, abstract of "II e Cong. Mondial Petrol, Sec. 2, Phys. Chem. Ruffinage" (1937), pages 163–167.

Urbanski et al., "Comptes Rendus Acad. Sci.," vol. 204 (1937), page 870.